United States Patent Office 3,166,910
Patented Jan. 26, 1965

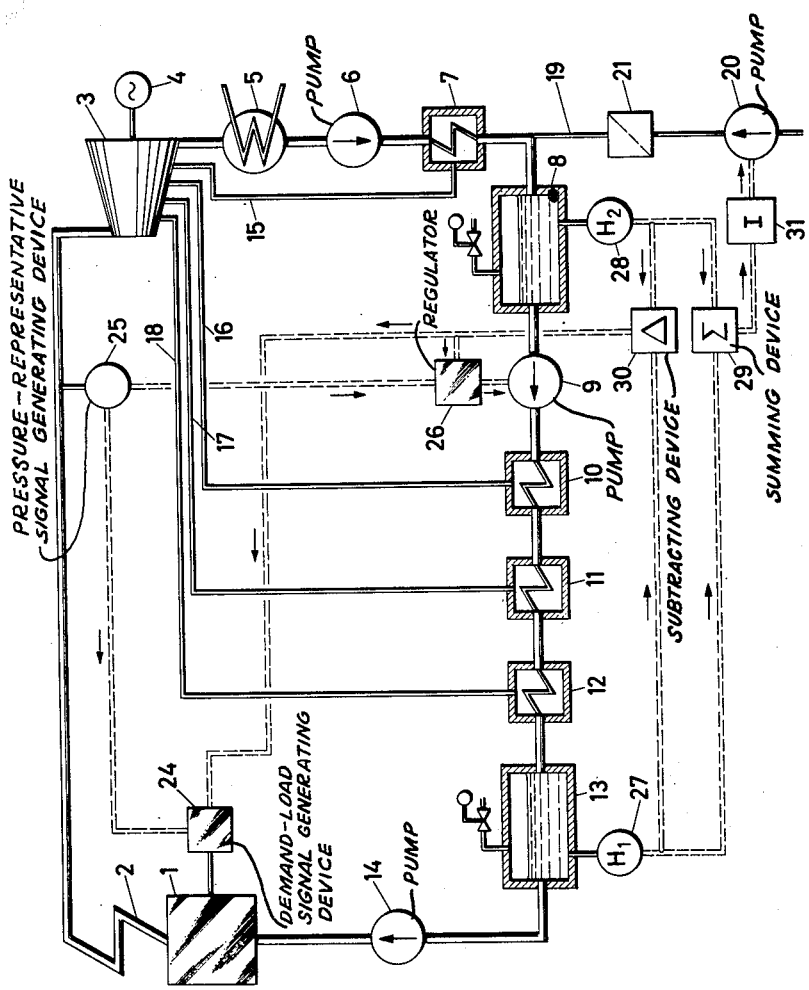

3,166,910
APPARATUS FOR CONTROL OF A STEAM POWER PLANT
Alfred Brunner, Winterthur, Switzerland, assignor to Sulzer Freres, Societe Anonyme, Winterthur, Switzerland, a Swiss company
Filed Feb. 1, 1963, Ser. No. 255,546
Claims priority, application Switzerland Feb. 6, 1962
8 Claims. (Cl. 60—107)

This invention pertains to apparatus for control of a steam power plant having a once-through forced-flow steam generator and a turbine coupled thereto.

More particularly the invention relates to such a system in which steam is tapped from the turbine for preheating of the feedwater and in which there are provided, upstream and downstream of at least one preheater or preheater section so heated, cold water and hot water storage vessels, the rate of feedwater flow being made dependent on the quantity of water present in these vessels as a function of a parameter of the system representative of the state of equilibrium thereof. By this parameter is meant a quantity which is related as a single-valued function to the difference between the quantity of energy developed and made available by the steam generator and the energy demand from the turbine or other steam-consuming machine, or to the time integral of this difference. Examples of quantities of this type are the fresh steam pressure upstream of the turbine, the rate of rotation of the turbine (or the frequency of the alternating current voltage developed in an alternator coupled to the turbine), and the temperature or heat content of a pressure equalizing vessel.

It is known to control the output of the turbine of a steam power generating system by varying the quantity of feedwater passed through a preheater or preheaters heated by steam tapped from the turbine. If feedwater storage vessels are provided upstream and downstream of such preheaters, then in the event of sudden changes in load, compensatory variations may be made, at least for limited times, in the water level in one or the other of these vessels, and hence in the amount of steam tapped from the turbine.

In a known system for control of this type there is withdrawn from a cold condensate storage vessel a quantity of the working substance, i.e. water, dependent on a water level, and optionally dependent also on the load, and a supplementary load-representative signal dependent on the water level in this vessel is delivered to the load signal generating device of the boiler. Under steady state conditions the water level in the condensate vessel is thus held constant.

This measurement of the water level in a single storage vessel and control thereby of the rate of feedwater flow through the preheater heated by tapped steam is subject to the disadvantage that in cases when there is too much or too little water in the storage vessels upstream and downstream of this preheater, the second vessel may be nearly filled or emptied. As a consequence the range over which control can be exercised is undesirably limited. Thus, if the quantity of water present is too great, there is a limit to control shifts which would increase the content of this vessel further. If the second vessel is nearly empty, the range of control in the sense which would withdraw more water from this vessel is likewise limited.

According to the invention there is generated a signal based upon the water level in each of the vessels. This signal, together with the equilibrium condition signal, is employed to regulate the rate of supply of feedwater to the tapped steam heated preheaters, or to control the power output of the boiler, or both.

The signal may advantageously represent the algebraic difference of the water contents of the two vessels. In such an embodiment there are achieved additional advantages, if there is developed a supplementary signal for control of the supply of make-up water. This supplementary signal may so affect the rate of introduction of make-up water that both vessels are filled to approximately half of their capacity. In this way there is provided a maximum control range in both directions, upward and downward, on the rate of feedwater input to the preheater.

A preferred embodiment of the invention is characterized by the fact that the first signal represents the difference and the second signal represents the sum of the contents of the two vessels. In such an embodiment the difference signal is used to control the rate of feedwater flow through the preheater and, optionally, the boiler output, and the sum signal is employed to govern the make-up feedwater input.

The invention will now be further described with reference to the accompanying drawings in which the single figure of drawings is a schematic diagram of an embodiment of the invention.

The drawing shows schematically a steam power system including a once-through forced-circulation steam generator 1, a superheater 2, and a turbine 3, coupled to an electric generator 4. At the outlet terminal of the turbine, the expanded working substance (steam, in practice) is delivered to a condenser 5 from which it is forwarded by means of a condensate pump 6 into a cold water storage vessel 8. A second condensate pump 9 drives the feedwater from the vessel 8 through preheaters 10, 11 and 12 into a feedwater vessel 13, from which the feed pump 14 delivers feedwater into the once-through forced-circulation steam generator. It is the rate of feedwater flow through the preheaters 10, 11 and 12 which, together with the steam consumption of those preheaters, is to be adjusted or controlled in accordance with the invention.

The individual preheaters 7 and 10 to 12 are connected by lines 15 to 18 respectively with turbine 3 in order to draw steam tapped therefrom.

Between the preheater 7 and the cold water storage vessel 8 there is provided a line 19 which enters the circuit of the working substance to supply make-up or supplementary feedwater, delivered by a pump 20 through a water purification or preparing device 21. This make-up water can of course be purified either upstream or downstream of the pump 20 and may alternatively be drawn from storage vessels in which it is stored in a previously purified condition.

A measuring device 25 is provided for measurment of the equilibrium-condition indicative quantity. In the embodiment illustrated the device 25 measures the fresh steam pressure upstream of the turbine.

The signal generated in the device 25 is employed on the one hand to govern in known fashion the demand-load representative signal generating device 24 for control of the boiler. In addition however the signal from the device 25 is delivered to a regulator 26 which adjusts the rate of feedwater flow through the preheaters 10 to 12 by operation on the condensate pump 9. The regulator 26 may however operate instead on a valve or flow control device upstream or downstream of the pump 9.

Water level representative signals are generated by the water level measuring devices 28 and 27 to provide signals representative of the water levels in the cold and hot water storage vessels 8 and 13. The sum $\Sigma$ of these signals is taken in a summing device 29, and the difference $\Delta$ thereof is taken in a subtracting device 30. The difference signal developed in the device 30 is delivered to controller 26 in order, together with the signal from the device 25, to control the rate of feedwater flow through the preheaters 10 to 12. At the same time or alternatively, the fluid water level difference signal may be delivered to the demand-load representative signal generating device 24. When the water level in the vessel 13 is higher than that in the vessel 8, the difference signal is negative and the operation of pump 9 will be shifted to reduce the rate of feedwater flow through the preheaters 10 to 12.

The sum signal is delivered to an integrally operating regulating device 31, from which the rate of operation of the make-up feedwater pump 20 is controlled.

The signal from the measuring device 25 may be delivered to the device 26 through a proportional, differential or proportional-differential signal shaping device, not shown. This signal may also be employed as a limiting signal on the rate of feedwater flow through the preheaters. The sum and difference signals advantageously operate with long time constants, as by delivery through integrating devices, on the make-up feed pump 20 and on the feed pump 9 or demand-load signal generating device 24 respectively.

The system illustrated in the drawing operates as follows: Let it be assumed that the system is in equilibrium with respect to energy, by which is meant that the rate of energy supply from the steam generator matches the instantaneous load. The water level measurements made at 27 and 28 produce in the device 30 an algebraic difference signal which is delivered to the controller 26, advantageously of proportional and integral mode of operation in respect of this input. Alternatively this difference signal is supplied to the device 24, or else to both of devices 24 and 26. The controller 26 regulates the operation of feed pump 9 as a function of this difference signal in such a manner that a specified water level will be maintained in both of the vessels 8 and 13. In this control of regulator 26 the signal from a device 25 is not yet operative. If now the device 25 notes a departure of the system from equilibrium, a signal corresponding thereto will be delivered to the controller 26, advantageously having a proportional and differential input for the signal from the device 25. With such a construction the device 26 responds rapidly to the signal from the device 25. The signal from device 25 is also delivered to the device 24. In the device 26 the signals from the devices 25 and 30 are so combined that the feed pump 9 is controlled not only as a function of the water levels in vessels 8 and 13 but also as a function of the condition of system equilibrium.

If for example the pressure measured by the device 25 upstream of the turbine increases, the signal generated in device 25 will so operate on the device 26 as to increase the quantity of feedwater passed through the preheaters 10 to 12. This means that the quantity of steam required for the operation of these preheaters will also be increased. This represents an increase in the steam demand of the consumer 3, and consequently the pressure upstream of the turbine will again decline. Upon a decline in pressure upstream of the turbine there will result a readjustment of the device 26 from the device 25 in the opposite sense.

As a consequence of the increased rate of feedwater flow through the preheaters 10 to 12 caused by regulator 26, the water level will be slightly raised in the vessel 13 and slightly lowered in the vessel 8. This will produce at the output of the device 30 a signal (or an increase in a previously existing signal) representative of a negative difference. The output of the device 30 will consequently so affect the regulator 26 as to reduce the throughput of the pump 9. Under the assumed conditions therefore the device 30 operates to reduce or mitigate the effect of the signal from the device 25. As already indicated however the device 25 is rapid in its effect on feedwater control, whereas the control from the water levels in vessels 8 and 13 is slow in making itself effective. The system according to the invention thus makes it possible to compensate in a temporary manner for a sudden disturbance of the energy equilibrium of the system, by adjustment of the rate of feedwater flow through one or more preheaters such as preheaters 10 to 12, with consequent change in the steam load demand on the system, such steam load demand change being of a temporary nature. In this way for example an increase in pressure upstream of the turbine is compensated for by an increase in the quantity of steam tapped from the turbine for preheating, until the unavoidable delay in boiler control at the device 24 may be overcome. The device 24 may control for example the rate of firing.

The combined water content of the vessels, separately measured at devices 27 and 28 and therefrom delivered to device 29 for combination, similarly adjusts in a slow manner the operation of the make-up feed pump 20. In this way there is always provided in the storage vessels a sufficient but not excessive amount of feedwater.

The control system of the invention is operable even if the subtracting device 30 or the adding device 29 is omitted therefrom. Thus for example if the device 30 is omitted, the signal delivered to the device 26 may take the form simply of the output signal of device 27 or 28, this signal being delivered alternatively or additionally to the device 26, and the sum signal developed in the adder 29 being employed to control the make-up pump 20, as already described. Thus the control of the invention includes not only the use of sum and difference signals as above described, but four other possibilities as well:

(a) Signal from device 27 disconnected from subtractor 30,
(b) Signal from device 27 disconnected from adder 29,
(c) Signal from device 28 disconnected from subtractor 30, and
(d) Signal from device 28 disconnected from adder 29.

Since these alternative embodiments do not require important changes in the circuit, they have not been separately shown in the drawing.

While the invention has been described in terms of a preferred embodiment, it is not restricted thereto. Thus the control system of the invention is not limited to the arrangement of storage vessels in the circuit of the working substance which has been shown, wherein the two vessels 8 and 13 are connected in series in the main stream of the working substance. Alternatively for example, one or both of the vessels may be disposed in a subordinate channel. Further, the cold water storage vessel 8 may be elsewhere disposed between the condenser and the tapped steam-heated preheaters whose steam requirements are to be varied. Similarly the connection into the circuit of the make-up water line 19 may be made at points other than that shown in the drawing, between condenser 7 and cold water vessel 8.

The control of the output of the turbine follows automatically without any additional control means, such as valves etc., in the pipes of the steam tapped from the turbine, by varying the quantity of feedwater flowing through the preheaters, which act as condensers of steam tapped from the turbine, since the quantity of the condensed steam and the pressure existing in the preheater is dependent on the rate of feedwater flow through the preheaters. The higher the rate of feedwater flow, the more is the quantity of steam condensed in the preheater and the higher is the rate of steam flow tapped from the turbine, and vice versa.

Besides said means for control of the output of the turbine the well known in art high pressure steam valve upstream of the high pressure stage of the turbine and intercept valves upstream of intermediate stages of the turbine can be arranged, which are biased by steam pressure, output of the turbine, number of revolutions of turbine or according to a program.

I claim:

1. Apparatus for control of a steam power plant including a once-through forced-circulation steam generator, a steam consuming device and a preheater coupled respectively to the output and input of said generator, and means to withdraw steam from said device for heating said preheater, said apparatus comprising separate liquid working substance storage vessels upstream and downstream of said preheater, means to measure the liquid level in each of said vessels, means to generate a signal responsive to said levels, means to generate a signal representative of the condition of equilibrium of the plant, and means to adjust the rate of flow of liquid working substance through said preheater in response to said signals.

2. Apparatus for control of a steam power plant including a once-through forced-circulation steam generator, a turbine and a preheater coupled respectively to the output and input of said generator, and means to withdraw steam from said turbine for heating said preheater, said apparatus comprising separate liquid working substance storage vessels upstream and downstream of said preheater, means to measure the liquid level in each of said vessels, means to generate a signal responsive to said levels, means to generate a signal representative of the condition of equilibrium of the plant, and means to adjust the rate of flow of liquid working substance through said preheater in response to said signals.

3. Apparatus according to claim 1 wherein said means to generate a signal responsive to said levels develops a signal representative of the algebraic difference of the levels in said vessels.

4. Apparatus for control of a steam power plant including a once-through forced-circulation steam generator, a turbine and a preheater coupled respectively to the output and input of said generator, and means to withdraw steam from said turbine for heating said preheater, said apparatus comprising separate liquid working substance storage vessels upstream and downstream of said preheater, means to measure the liquid level in each of said vessels, means to generate a signal responsive to said levels, means to generate a signal representative of the condition of equilibrium of the plant, and means to adjust the power output of said generator in response to said signals.

5. Apparatus for control of a steam power plant including a once-through forced-circulation steam generator, a turbine and a preheater coupled respectively to the output and input of said generator, and means to withdraw steam from said turbine for heating said preheater, said apparatus comprising separate liquid working substance storage vessels upstream and downstream of said preheater, means to measure the liquid level in each of said vessels, means to generate a signal responsive to said levels, means to generate a signal representative of the condition of equilbrium of the plant, and means to adjust the rate of firing of said generator in response to said signals.

6. Apparatus for control of a steam power plant including a once-through forced circulation steam generator, a turbine, a condenser, and a preheater connected into a closed circuit, means to withdraw steam from the turbine for heating said preheater, and means to apply make-up water to said circuit, said apparatus comprising separate liquid working substance storage vessels in said circuit upstream and downstream of said preheater, means to measure the liquid level in each of said vessels, means to generate a signal responsive to said levels, means to generate a signal representative of the condition of equilibrium of the plant, means to adjust the rate of feedwater flow through said preheater in response to said signals, and means to adjust the rate of make-up water supply to said circuit in response to said first-named signal.

7. Apparatus for control of a steam power plant including a once-through forced-circulation steam generator, a turbine, a condenser, and a preheater connected into a closed circuit, means to withdraw steam from the turbine for heating said preheater, and means to supply make-up water to said circuit, said apparatus comprising separate liquid working substance storage vessels upstream and downstream of said preheater, means to measure the liquid level in each of said vessels, means to generate separate signals representative respectively of the sum and difference of the liquid levels in said vessels, means to generate a signal representative of the condition of equilibrium of the plant, means to adjust the rate of feedwater flow through said preheater in response to said difference and equilibrium signals, and means to adjust the rate of make-up water supply to said circuit in response to said sum signal.

8. Apparatus for control of a steam power plant including a once-through forced-circulation steam generator, a condenser, and a preheater connected into a closed circuit, and means to withdraw steam from the turbine for heating said preheater, said apparatus comprising separate feedwater storage vessels upstream and downstream of said preheater, means to measure the water level in each of said vessels, means to measure the steam pressure at the input to said turbine, slow acting means to adjust the rate of feedwater flow through said preheater as an inverse function of relative increase in water level in said upstream vessel over water level in said downstream vessel, and fast acting means to adjust the rate of feedwater flow through said preheater as a direct function of said pressure.

References Cited in the file of this patent
UNITED STATES PATENTS 1,964,773    Smoot ------------------ July 3, 1934

UNITED STATES PATENT OFFICE
CERTIFICATE OF CORRECTION

Patent No. 3,166,910 January 26, 1965

Alfred Brunner

It is hereby certified that error appears in the above numbered patent requiring correction and that the said Letters Patent should read as corrected below.

Column 6, line 7, for "apply" read -- supply --.

Signed and sealed this 20th day of July 1965.

(SEAL)
Attest:

ERNEST W. SWIDER
Attesting Officer

EDWARD J. BRENNER
Commissioner of Patents